Patented Jan. 26, 1954

2,667,463

UNITED STATES PATENT OFFICE 2,667,463

INTERPOLYMER OF CYCLO-DIOLEFINE AND AN UNSATURATED ESTER

Robert H. Jakob, San Francisco, and Roy W. H. Tess and Theodore F. Bradley, Orinda, Calif., assignors to Shell Development Company, Emeryville, Calif., a corporation of Delaware No Drawing. Application November 6, 1951, Serial No. 255,138

9 Claims. (Cl. 260—23.7)

This invention relates to interpolymers of a conjugated cyclo-diolefine containing 5 to 6 carbon atoms in the ring such as cyclopentadiene or 1,3-cyclohexadiene with an olefinically-unsaturated higher fatty acid polyester of glyceryl polyethers of dihydric phenols, which interpolymers have been discovered to possess unusually superior protective properties after drying as films. More particularly, the invention pertains to interpolymers of cyclopentadiene and drying oil fatty acid polyesters of a special class of esterifiable aromatic polyethers.

Natural drying oils are notably lacking in the rapid rate of drying needed for modern industrial uses. They also give dried films which are lacking in suitable hardness and durability. With the object of overcoming such faults, it has been proposed heretofore to interpolymerize cyclopentadiene with natural oils (glycerides such as linseed or soybean oil) so as to obtain products more suitable for use as protective films. Although such interpolymerization somewhat improves the drying times and hardness, the dried films of such products have poor mar resistance and poor alkali resistance. Satisfactory alkali resistance for surface-coating films is of utmost importance because it is customary to subject many protective coatings to repeated contact with washing and cleansing solutions such as soapy water which is of basic character and often contains considerable amounts of free alkali.

We have now prepared interpolymers of conjugated cyclodiolefines such as cyclopentadiene and olefinically unsaturated fatty acid polyesters of glyceryl polyethers of dihydric phenols, and also have discovered these to be unexpectedly superior products. Our new interpolymers not only dry at a very rapid rate to give films of excellent hardness, but also, the resulting dried films have alkali resistance so vastly superior to that of films from the cyclopentadiene-drying oil interpolymers that the properties of the two are not comparable. Moreover, we discovered that the dried films of our interpolymers are also tough as well as very hard, and therefore, the dried films of our interpolymers are much more resistant to marring than are the dried films of interpolymers of cyclopentadiene and the natural glycerides.

In brief, our invention is an interpolymer of a conjugated cyclo-diolefine containing 5 to 6 carbon atoms in the ring, and an olefinically unsaturated fatty acid polyester of an esterifiable glyceryl polyether of a dihydric phenol having terminal glyceryl groups and having alternating glyceryl radicals and the hydrocarbon radicals of the phenol (aromatic nuclei) united in a chain by ether oxygen atoms between said radicals, which acid contains 12 to 22 carbon atoms and has an iodine value of 110 to 400, and which polyester contains at least three acyloxy groups of the fatty acid joined to the glyceryl groups of the polyether. Preferably, the cyclo-diolefine is cyclopentadiene and the acid is a drying oil fatty acid such as linseed oil fatty acid.

The esters employed as a component in our interpolymers are olefinically unsaturated higher fatty acid polyesters of esterifiable glyceryl polyethers of dihydric phenols. The esterifiable polyethers are obtained by reacting a dihydric phenol in alkaline solution with epichlorhydrin. These polyethers have a chemical structure wherein the glyceryl radicals from the epichlorhydrin, and the divalent aromatic hydrocarbon radicals from the dihydric phenol are present as a chain with the two types of radicals alternating and being joined into the chain by ethereal oxygen atoms. The terminal groups of the chain in the polyethers largely contain 1,2-epoxy groups due to the presence of a glycidyl radical thereat although some of the terminal groups may be dihydroxyl-glyceryl radicals from hydration of the glycidyl radical.

The simplest of the polyethers are diglycidyl diethers of dihydric phenols which contain a single divalent aromatic hydrocarbon radical from the dihydric phenol and have two glycidyl radicals linked thereto by ethereal oxygen atoms. More generally, the polyether is of resinous character and contains two or more aromatic hydrocarbon radicals alternating with glyceryl groups which are connected therewith through ether oxygen atoms. Ordinarily, the polyether is a complex mixture of compounds rather than being a single particular compound. The principal product may be represented by the formula

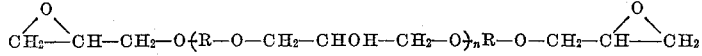

wherein $n$ is an integer of the series 0, 1, 2, 3 . . . , and R represents the divalent hydrocarbon radical of the dihydric phenol. While for any single molecule, $n$ will be an integer, the fact that the polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form.

The esterifiable groups contained in the polyethers are attached to the glyceryl radicals

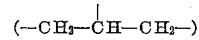

therein. These esterifiable groups are epoxy groups and alcoholic hydroxyl groups, both of which are attached to the glyceryl radicals. Upon reaction of the polyethers with the unsaturated fatty acids, both of these esterifiable groups form ester linkages to the glyceryl radicals by joinder thereto of acyloxy groups. While $n$ is ordinarily a value from 0 to 10 in the polyethers, it is generally preferred to employ esters from polyethers wherein $n$ is 1 to 6.

Any of the various dihydric phenols is used in preparing the esterifiable polyethers including mononuclear phenols such as resorcinol, catechol, hydroquinone, methyl resorcinol, etc.; or polynuclear phenols like 2,2-bis(4-hydroxyphenyl)propane (bis-phenol), 4,4'-dihydroxybenzophenone, bis(4-hydroxyphenyl)methane, 1,1-bis(4-hydroxyphenyl)ethane, 1,1-bis(4-hydroxyphenyl)isobutane, 2,2-bis(4-hydroxyphenyl)butane, 2,2-bis(4-hydroxy-2-methylphenyl)propane, 2,2-bis(4-hydroxy-2-tertiarybutylphenyl)propane, 2,2-bis(2-hydroxynaphthyl)pentane, 1,5-dihydroxynaphthalene, etc.

The esterifiable polyethers are prepared, in general, by heating at about 50° C. to 200° C. the dihydric phenol with epichlorhydrin in a basic reaction medium. Depending upon the type of product desired, there is used from more than 1 to 2 or more mols of epichlorhydrin per mol of dihydric phenol. Also present is a base such as sodium, potassium, calcium or barium hydroxide, generally in amount of about 5% to 30% stoichiometric excess of the epichlorhydrin, i. e., 1.05 to 1.3 equivalents of base per mol of epichlorhydrin. In effecting the reaction, the dihydric phenol is mixed with an aqueous solution of the base and heated. The epichlorhydrin is then added rapidly to the stirred reaction mass. The initial reaction is somewhat exothermic so that a temperature rise occurs to some extent. After addition of the epichlorhydrin, heating is applied for several hours while stirring in order to complete the reaction. While still in molten state, the formed polyether is washed with water until free of base.

The employed mol ratio of epichlorhydrin to dihydric phenol controls the molecular weight of the resulting polyether. By use of a substantial excess such as 3 to 10 mols of epichlorhydrin per mol of dihydric phenol, there is obtained as predominant product, the simple diglycidyl diether of the dihydric phenol ($n$ equals or approaches zero). This polyether is best prepared by mixing the epichlorhydrin and dihydric phenol, heating and then adding about two equivalents of the base per mol of dihydric phenol at such a rate that the reaction mixture is about neutral during the whole time of the reaction. The length of the chain of the polyether value of $n$) is increased by decreasing the mols of epichlorhydrin to dihydric phenol. Thus by decreasing the mols of epichlorhydrin per mol of dihydric phenol from about two downwards toward one, the molecular weight, the softening point and the number of esterifiable groups are increased.

The nature of the glyceryl polyethers from the dihydric phenols can be better understood by considering preparation of a particular product which we prefer to use in our invention. For convenience, this product will hereinafter be designated as polyether A.

*Polyether A*

Into a reaction vessel fitted with a stirrer, 4 mols of 2,2-bis(4-hydroxyphenyl)propane (bisphenol) and 6.43 mols of sodium hydroxide as a 10% aqueous solution are introduced and heated to about 45° C. whereupon 5 mols of epichlorhydrin are added rapidly while agitating the mixture. The temperature is then adjusted so that the mixture is heated at about 100° C. to 105° C. for about 80 minutes. The mixture separates into a two-phase system and the aqueous layer is decanted. The resulting polyether is then washed with boiling water until neutral to litmus whereupon the resulting product is drained and dehydrated by heating at about 150° C.

The polyether has a softening point of about 100° C. (Durrans' mercury method). The molecular weight is 1400 measured ebullioscopically in ethylene dichloride so average $n=3.7$. The esterification value is 0.557 equivalent per 100 grams. The esterification value is obtained by heating a sample of the polyether with about twice the theoretical amount of higher fatty acid necessary to react with all of the hydroxyl and epoxy groups, the higher fatty acid being Armour's Neofat No. 3 consisting of about 50% linoleic acid, 40% oleic acid, and 10% stearic acid. The heating is effected at about 230° C. until a constant acid value is obtained. This may require 10 hours' heating. By back titrating the unreacted fatty acid with base, a measure is obtained from which the esterification value may be calculated. The polyether also had an epoxy value of 0.103 equivalent per 100 grams and a hydroxyl value of 0.328 equivalent per 100 grams.

In like manner, other polyethers of bis-phenol or of other dihydric phenols may be prepared which will have different molecular weights and values for $n$ depending upon the molar ratio of epichlorhydrin to dihydric phenol used in preparation thereof. This fact is illustrated with various glyceryl polyethers of bis-phenol made with variation in molar ratio as shown in the following table.

| Polyether | Mol ratio epichlorhydrin to bisphenol | Mol ratio NaOH to epichlorhydrin | Softening point, ° C. | Mol weight | $n$ | Ester value, equivalent per 100 g. |
|---|---|---|---|---|---|---|
|   | 2.6 | 1.1 | 27 | 469 | 0.5 | 0.915 |
| B | 2.04 | 1.05 | 42 | 710 | 1.3 | 0.961 |
|   | 1.57 | 1.2 | 71 | 900 | 2.0 | 0.747 |
| A | { 1.25 | 1.1 | 100 | 1,400 | 3.7 | 0.557 |
|   |   |   | 130 | 2,900 | 9.0 | 0.532 |

Polyethers of still higher molecular weight are best obtainable by reacting a polyether of lower molecular weight with a small quantity of dihydric phenol. For example, a resinous polyether having a softening point of about 130° C., a molecular weight of 2900 and an esterification value of 0.505 equivalent per 100 grams is obtained by reacting polyether A with an added 5% of bisphenol. This reaction is effected by heating the polyether to 150° C., and then adding the bisphenol. The heating is continued for about two hours while stirring the reaction mass and gradually increasing the temperature to about 200° C. This product is also listed in the above table.

The interpolymers of the invention contain esters of the polyethers and olefinically unsaturated fatty acid, which acid contains 12 to 22 carbon atoms and has an iodine value of 110 to 400. Although the acid is ordinarily derived from a natural oil, acids of proper chain length and iodine value from other sources are likewise suitable. It is preferred that the only unsaturation in the fatty acid be from presence therein of one or more olefinic double bonds, but the esters from acids also containing acetylenic triple-bond unsaturation are likewise applicable.

Various natural oils classified as drying or semi-drying oils are suitable sources of the unsaturated fatty acids for the esters. Ordinarily the acid from the natural oil is a mixture of different fatty acids, some saturated and some unsaturated to greater or lesser degree. The presence of saturated acids is not objectionable so long as the acid as a whole has an iodine value of at least 110. The esters thus contain acyl groups from one or more representative unsaturated acids such as hiragonic, linoleic, linolenic, elaeostearic, licanic, arachidonic, and clupanodonic. It is preferred that the acid contain one or more polyene, e. g., di- to penta-ene fatty acids. Substantial quantities of one or more of these acids occur (in the form of glycerides) in many natural oils including linseed, soybean, corn, cottonseed, hemp seed, kapok seed, herring, perilla, poppy seed, pilchard, whale, manhaden, mustard, peanut, rapeseed, salmon, sardine, walnut, dehydrated castor, rubber seed, safflower, sesame, tung and oiticica oils, all of which yield fatty acid suitable for use in the esters of the polyethers. Thus, although there is some variation due to geographical and climatic differences, linseed oil contains about 45% linolenic acid, about 25% linoleic acid, and about 20% oleic; soybean oil contains about 50% linoleic acid; tung oil contains about 80% elaeostearic acid; cotton seed oil contains about 40% linoleic acid; hempseed oil contains about 50% linoleic acid and about 25% linolenic acid; and oiticica oil contains about 10% linoleic acid and about 75% licanic acid. As previously noted, the presence in the acid of saturated acids such as lauric, myristic, palmitic, stearic and behenic is not objectionable as is also true of monoolefinic acids such as lauroleic, myristoleic, palmitoleic, oleic, gadoleic and erucic, provided the iodine value of the acid as a whole is at least 110.

It is most preferred that the esters of the polyethers employed in the invention contain the acyl groups from linseed oil fatty acid. Such linseed oil fatty acid is well known in the art and may be obtained, as is also the case with fatty acid of other natural oils mentioned above, by hydrolyzing the oil, or by subjecting the oil to saponification with a base and thereafter acidifying the saponification product to obtain the free acid. Other preferred esters of the polyethers contain acyl radicals of soybean oil fatty acid, safflower oil fatty acid, and dehydrated castor oil fatty acid. In some cases, it is desirable to employ esters from mixtures of two or more natural oil fatty acids, such as soybean oil fatty acid, in admixture with linseed oil, tung oil or dehydrated castor oil fatty acid containing about 5% to 75% or more of the latter in the mixture.

The esters of the polyethers are prepared by heating and esterifying the polyether with the unsaturated fatty acid. The esterification is effected at temperatures of from about 125° C. to 275° C. in the presence or absence of an esterification catalyst such as sulfuric acid, phosphoric acid, toluene sulfonic acid, or the like. Preferably the esterification is conducted in an inert atmosphere such as by sparging with carbon dioxide. Since water is a product of the reaction, it is desirable to have present an inert azeotroping agent capable of removing the formed water by distillation. Xylene is an excellent material for this purpose, although other suitable agents include benzene, toluene and aromatic petroleum distillates. In preparing the ester, the heating and esterification are continued until the acid number of the product (solids basis) is reduced to less than 30, and preferably to less than 20. In order that the acid number of the polyester may be reducible to the indicated value, the initial proportions of the polyether and fatty acid are so chosen that up to about an equivalent amount of fatty acid is reacted with the esterifiable polyether, i. e., such proportion that there is up to about one carboxylic acid group of the fatty acid for each esterifiable group in the polyether whether that esterifiable group be an alcoholic group and/or an exopy group. The polyesters for use in the invention contain at least three acyloxy groups from the fatty acid joined to glyceryl radicals of the polyether. Preferably they contain six to ten groups.

While not to be construed as limiting, the following describe in some detail preparation of some polyesters used in the invention. For convenience, these will be designated polyester A and polyester B.

Polyester A

In a glass apparatus equipped with phase separating condenser, stirrer, and nitrogen bubbler, a mixture of 160 parts by weight of xylene as azeotroping agent, 900 parts by weight of polyether A and 1100 parts by weight of linseed oil fatty acid having an iodine value of 184 was heated to 250° C. in 135 minutes and held at 250° C. for 4 hours and 35 minutes. The product after dilution with xylene to a non-volatile or polyester content of 50%, and filtration through Super-cel, had an acid number of 3.7 mg. KOH per g. on solids and a Gardner-Holdt viscosity of H.

Polyester B

In the manner similar to that described above, a mixture of 600 parts of polyether A, 586 parts of soybean fatty acid, 147 parts of dehydrated castor oil fatty acid, and a small quantity of xylene were heated to 250° C. in 4 hours and held at that temperature for 2 hours and 15 minutes. The reaction mixture was then diluted with additional xylene and filtered with the acid of Super-cel. The filtrate of mixed polyester contained 48.1% solids.

The interpolymer of the invention is prepared by interpolymerizing the polyester with a conjugated cyclo-diolefine containing 5 to 6 carbon atoms in the ring. For this purpose, any of the cyclo-diolefines of the class can be used such as cyclopentadiene, methylcyclopentadiene, 5,5-dimethylcyclopentadiene, 5 - methyl - 5 - propylcyclopentadiene, 1,1,2-trimethylcyclopentadiene, 1,5,5-trimethylcyclopentadiene, 1,3-cyclohexadiene, 1 - methyl - 1,3 - cyclohexadiene, 2-methyl - 1,3 - cyclohexadiene, 2 - ethyl - 1,3-cyclohexadiene, 2-butyl-1,3-cyclohexadiene, 4-methyl-1,3-cyclohexadiene, 5-methyl-1,3-cyclohexadiene, 1,5,5-trimethyl-1,3-cyclohexadiene, and 4-methyl-6-isopropyl-1,3-cyclohexadiene, as well as mixture of two or more thereof. Interpolymer of the polyester and cyclopentadiene or 1,3-cyclohexadiene is preferred, particularly of the former diene.

In effecting interpolymerization of the cyclo-diolefine with the polyester, the mixture of the reactants is heated under an inert atmosphere at a temperature of about 200° C. to 350° C., preferably about 250° C. to 300° C. Owing to the high temperature employed and the fact that the interpolymerization is a liquid phase reaction, it is usually necessary to use a superatmospheric pressure sufficiently high that a liquid phase is present in the reaction vessel. Closed reaction vessels are ordinarily used and the vapor space has the air displaced by an inert gas such as methane, carbon dioxide or nitrogen. Although the interpolymerization may be effected with use of monomer of the cyclo-diolefine, it is convenient to employ dimer thereof. It is believed that when dimer is employed, the temperature is sufficiently high that the dimer depolymerizes and the formed monomer then instantly interpolymerizes with the polyester to form the adduct. Polymer of higher degree such as trimer and/or tetramer may also be used, but is less desirable. The presence of hydrocarbon impurities commonly associated with commercial cyclo-diolefines is not harmful. Furthermore, it is not necessary to remove aromatic hydrocarbon solvents in which the polyester is usually dissolved when prepared. Thus the interpolymerization may be effected, if desired, in the presence of an inert solvent such as benzene, toluene, xylene or aromatic petroleum fractions or products.

The amount of chemically combined or polymerized cyclo-diolefine contained in the interpolymer of the invention can be varied to considerable extent. The interpolymer usually contains about 5% to 60% by weight of polymerized cyclo-diolefine. A more desirable proportion is from about 15% to 50% by weight of polymerized cyclo-diolefine, and preferably the interpolymer contains about 20% to 40% by weight of chemically combined cyclo-diolefine. The proportion of polymerized cyclo-diolefine desired to be contained in the interpolymer is realized by choice of the proper proportion of the diene mixed with the polyester before interpolymerization, and the time of interpolymerization. Although it is possible to effect complete interpolymerization of the cyclo-diolefine with the polyester by continuing the heating for sufficient time, it is more customary to employ an excess of cyclo-diolefine over that expected to chemically combine with the polyester so that unduly long time of heating is not used, and to remove the unpolymerized excess after the interpolymerization by distillation or the like. The time of heating necessary to effect the desired extent of interpolymerization is usually several hours. The time of heating is, of course, also dependent upon the particular polyester, cyclo-diolefine and temperature of interpolymerization. Longer times are needed at lower temperatures in order to effect the same extent of interpolymerization.

Preparation of several typical interpolymers of the invention are described in the following examples which are given to illustrate, but not limit, the invention. The parts and percentages are by weight.

*Interpolymer A-1*

A mixture of about 100 parts of polyester A as a 52% solution in xylene and about 62.9 parts of dicyclopentadiene as a 70% commercial concentrate was placed in a glass tube. The vapor space in the tube was filled with nitrogen and the tube was sealed. The tube and contents were heated for 5 hours at about 275° C. to effect the interpolymerization. The resulting interpolymer was found to contain about 36.7% of polymerized cyclopentadiene which was obtained as a 38.6% solution having a Gardner-Holdt viscosity of A-2. The solution had a Gardner color of 11 and the interpolymer therein had a saponification value of 0.171 equivalent per 100 grams. Solvent was evaporated from the solution until it had a Gardner-Holdt viscosity of E-F and a solids content of 50.5%. This solution of the interpolymer was used in film-forming tests to be described hereinafter.

*Interpolymer A-2*

Another mixture of about 100 parts of polyester A as the 52% solution in xylene and about 30 parts of dicyclopentadiene was placed in a glass tube, the ullage of the tube filled with nitrogen, and the tube sealed. After heating for 5 hours at about 275° C., it was found that the resulting solution had a Gardner-Holdt viscosity of A-3, a Gardner color of 8, and contained about 34.6% of interpolymer containing about 19.4% polymerized cyclopentadiene. In order to prepare the solution for film-forming tests on the interpolymer, the solution was evaporated to a Gardner-Holdt viscosity of E-F and an interpolymer concentration of 52%.

*Interpolymer B*

A mixture of about 100 parts of polyester B as a 54.5% solution in xylene and about 62.9 parts of dicyclopentadiene as the 70% commercial concentrate was placed in a glass tube. The tube was sealed with nitrogen in the ullage. The tube and contents were heated at about 275° C. for 5 hours whereby there was produced a 55.5% solution of interpolymer having a Gardner-Holdt viscosity of F and a Gardner color of 9. The interpolymer was found to contain about 38.2% of polymerized cyclopentadiene and to have a saponification value of 0.013 equivalent per 100 grams. The solution was used without evaporation for the film-forming tests.

In order to test the film-forming qualities and the properties of the resulting films, drier in amount of about 0.05% cobalt (based upon the interpolymer) as the naphthenate salt was added to the above-described solutions of interpolymers A-1, A-2 and B. For drying times and Sward hardness measurements, films were cast on glass panels with a doctor blade to give one mil dry thickness. Drying times were determined according to the procedures described by Henry A. Gardner in "Physical and Chemical Examination of Paints, Varnishes, Lacquers and Colors," 1939, pages 106–107. The alkali resistance of the dried films was measured according to A. S. T. M. Designation D154–43. The mar resistance was determined by drawing the edge of a fingernail across dried films of the interpolymers and observing the extent of indentation.

For purpose of comparison, parallel tests were made with an interpolymer of cyclopentadiene and linseed oil sold under the trade name of Cykelin, an an interpolymer of cyclopentadiene and soybean oil known as Cykesoy. Films from about 75% solutions in volatile hydrocarbons of these glyceride-cyclopentadiene interpolymers were similarly laid down, the interpolymers likewise containing about 0.05% cobalt as napthenate salt. The solutions had a Gardner-Holdt viscosity of E-F.

Parallel tests were also made with linseed oil which contained more dried, namely, 0.05% cobalt and 0.5% lead as naphthenate salts.

The results of the tests are given in the following table. Time is indicated symbolically in the table. Thus the symbol 0–10 indicates a time of ten minutes, and the symbol 1–50 indicates a time of one hour and fifty minutes.

From the results tabulated below, it is evident that the interpolymers of the invention have a markedly superior combination of properties of drying times, hardness, alkali resistance and mar resistance.

| | Interpolymer A-1 | Interpolymer A-2 | Interpolymer B | Cykelin | Cykesoy | Linseed oil |
|---|---|---|---|---|---|---|
| Percent cyclopentadiene | 36.7 | 19.4 | 38.2 | 14 | 14 | 0. |
| Drying times: | | | | | | |
|   Set to touch | 0-10 | 0-20 | 0-20 | 1-50 | 3-00 | 1-20. |
|   Cotton-free | 0-50 | 2-00 | 3-00 | 22-00 | 8 days | Not in 50 days. |
| Sward hardness: | | | | | | |
|   After 1 week | 28 | 47 | 49 | 8 | 2 | 0. |
|   After 4 weeks | 62 | 60 | 54 | 8 | 2 | 2 (8 weeks). |
| Alkali resistance (ASTM D154-43), first failure | 7-00 | 7-00 | 2-00 | 0-03 | 0-03 | 0-05. |
| Mar resistance to fingernail after 4 weeks | Good | Good | Good | Poor | Poor | Poor. |

Another interpolymer of the invention was prepared from a different polyester, and likewise found to possess the excellent properties which characterizes the products of the invention. The parts and percentages given below are again by weight.

Interpolymer C

Interpolymer C was an interpolymer of cyclopentadiene and linseed oil fatty acid polyester of polyether B (lower molecular weight than polyether A). The polyester was prepared in a glass reactor fitted with a phase separating condenser and stirrer by heating a mixture of 360 parts of polyether B, 788 parts of linseed oil fatty acid and a small quantity of xylene as azeotropic agent to remove the formed water of reaction. The mixture was heated up to 250° C. in 130 minutes and held at that temperature for 6 hours and 40 minutes. In this time, the acid number of the solids was reduced to 19.8. The product was diluted with xylene to a concentration of 66% solids.

The interpolymer was prepared by charging a mixture of about 100 parts of the polyester as the solution and about 69.2 parts of dicyclopentadiene as the 70% commercial concentrate to a glass tube. The air in the vapor space of the tube was displaced with nitrogen, and the tube was sealed. The tube and contents were heated for five hours at 275° C. The resulting interpolymer was found to contain about 32.6% polymerized cyclopentadiene which was obtained as a 48.7% solution having a Gardner-Holdt viscosity of A-2. The solution had a Gardner color of 6-7 and the interpolymer therein had a saponification value of 0.166 equivalent per 100 grams. Solvent was evaporated from the solution until it had a Gardner-Holdt viscosity of E-F and a solids content of about 60.4%. Cobalt naphthenate was added to the solution in such amount that 0.05% cobalt was present based upon the weight of interpolymer therein. Films of the interpolymer were likewise found to dry very rapidly, and the resulting dried films had excellent hardness, mar resistance and alkali resistance.

The interpolymers of the invention are very useful products and are particularly suitable as protective surface-coating materials. For this purpose, various substances may be incorporated with them including pigments, drying oils, resins, varnishes, solvents, and the like which are known and employed in manufacture of surface coating formulations.

We claim as our invention:

1. An interpolymer of a conjugated cyclo-diolefine containing 5 to 6 carbon atoms in the ring, and an olefinically unsaturated fatty acid polyester of an esterifiable glyceryl polyether of a dihydric phenol having terminal glyceryl groups and having alternating glyceryl radicals and the hydrocarbon radicals of the phenol united in a chain by ether oxygen atoms between said radicals, which acid contains 12 to 22 carbon atoms and has an iodine value of 110 to 400, and which polyester contains at least three acyloxy groups of the fatty acid joined to the glyceryl groups of the polyether, said interpolymer containing about 5% to 60% by weight of polymerized cyclo-diolefine.

2. An interpolymer as defined in claim 1 wherein the cyclo-diolefine is a member of the group consisting of cyclopentadiene and 1,3-cyclohexadiene.

3. An interpolymer as defined in claim 1 wherein the cyclo-diolefine is cyclopentadiene.

4. An interpolymer as defined in claim 1 wherein the cyclo-diolefine is cyclopentadiene and the acid is drying oil fatty acid.

5. An interpolymer of cyclopentadiene and an olefinically unsaturated fatty acid polyester of an esterifiable polyether of 2,2-bis(4-hydroxyphenyl)propane having terminal glycerol groups and having alternating glyceryl radicals and the hydrocarbon radicals of the phenol united in a chain by ether oxygen atoms between said radicals, which acid contains 12 to 22 carbon atoms and has an iodine value of 110 to 400, and which polyester contains at least three acyloxy groups of the fatty acid joined to the glyceryl radicals of the polyether, said interpolymer containing 15% to 50% by weight of polymerized cyclopentadiene.

6. An interpolymer as defined in claim 5 wherein the acid is drying oil fatty acid.

7. An interpolymer as defined in claim 5 wherein the acid is linseed oil fatty acid and the polyester contains five to ten acyloxy groups of the fatty acid joined to the glyceryl radicals of the polyether.

8. An interpolymer as defined in claim 5 wherein the acid is linseed oil fatty acid, the polyester contains five to ten acyloxy groups of the fatty acid joined to the glyceryl radicals of the polyether, and the interpolymer contains about 20% to 40% by weight of polymerized cyclopentadiene.

9. An interpolymer as defined in claim 5 wherein the acid is a mixture of about 80% soybean oil fatty acid and about 20% dehydrated castor oil fatty acid, and the polyester contains five to ten acyloxy groups of the acid linked to the glyceryl radicals of the polyether.

ROBERT H. JAKOB.
ROY W. H. TESS.
THEODORE F. BRADLEY.

References Cited in the file of this patent

UNITED STATES PATENTS

| Number | Name | Date |
|---|---|---|
| 2,574,753 | Opp et al. | Nov. 13, 1951 |
| 2,575,440 | Bradley | Nov. 20, 1951 |